United States Patent

Breslin et al.

(10) Patent No.: US 8,792,843 B2
(45) Date of Patent: Jul. 29, 2014

(54) MULTI-CHANNEL RX/TX CALIBRATION AND LOCAL OSCILLATOR MISMATCH MITIGATION

(71) Applicant: QUALCOMM Incorporated, San Diego, CA (US)

(72) Inventors: Donald Breslin, Sunnyvale, CA (US); Jeffrey M. Gilbert, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/957,294

(22) Filed: Aug. 1, 2013

(65) Prior Publication Data

US 2013/0314295 A1 Nov. 28, 2013

Related U.S. Application Data

(62) Division of application No. 12/942,659, filed on Nov. 9, 2010, now Pat. No. 8,532,598, which is a division of application No. 11/613,977, filed on Dec. 20, 2006, now Pat. No. 7,853,216.

(60) Provisional application No. 60/753,795, filed on Dec. 22, 2005.

(51) Int. Cl.
*H03K 17/74* (2006.01)
*H04B 17/00* (2006.01)

(52) U.S. Cl.
USPC .................. 455/226.1; 455/67.11; 455/67.14; 327/503; 327/493; 343/853

(58) Field of Classification Search
USPC ........ 455/208, 209, 315, 67.11, 67.14, 226.1; 327/493, 503; 343/853
See application file for complete search history.

(56) References Cited

U.S. PATENT DOCUMENTS

| | | | |
|---|---|---|---|
| 4,975,644 A * | 12/1990 | Fox ............................... | 324/318 |
| 5,644,492 A | 7/1997 | Reichmuth et al. | |
| 5,909,470 A | 6/1999 | Barratt et al. | |
| 5,999,826 A | 12/1999 | Whinnett | |
| 6,037,898 A | 3/2000 | Parish et al. | |
| 6,351,628 B1 * | 2/2002 | Leizerovich et al. ........... | 455/83 |

(Continued)

FOREIGN PATENT DOCUMENTS

JP  2006140562 A  6/2006

OTHER PUBLICATIONS

Javid, M., Analysis, Transmission, and Filtering of Signals, 1963, McGraw Hill, p. 151 up up up.*

(Continued)

*Primary Examiner* — Gennadiy Tsvey
(74) *Attorney, Agent, or Firm* — Holland & Hart LLP

(57) ABSTRACT

A method and system of optimizing transmit beam forming in a multiple radio wireless system is provided. A stimulus signal can be provided to an analog receive input of a device under test (DUT), wherein the DUT includes multiple radios. A receive phase and amplitude can be measured at baseband using the stimulus signal for each radio. At this point, a receive weight and its conjugate can be determined using the receive phases and amplitudes. A calibration vector and its conjugate can also be determined, wherein a product of the receive weight conjugate and the calibration vector conjugate generate a transmit weight. This transmit weight can be applied to transmit signals during the transmit beam forming using the multiple radios.

4 Claims, 4 Drawing Sheets

(56) References Cited

U.S. PATENT DOCUMENTS

| | | |
|---|---|---|
| 7,203,462 B2 | 4/2007 | Kuwahara et al. |
| 7,342,912 B1 | 3/2008 | Kerr et al. |
| 7,680,461 B2 | 3/2010 | Takano |
| 7,853,216 B1 | 12/2010 | Breslin et al. |
| 2001/0011961 A1 | 8/2001 | Rexberg et al. |
| 2003/0185326 A1 | 10/2003 | Kolze |
| 2004/0070533 A1 | 4/2004 | Azuma |
| 2004/0198291 A1* | 10/2004 | Wilcox .......... 455/269 |
| 2004/0219892 A1 | 11/2004 | Vaidyanathan et al. |
| 2005/0061271 A1 | 3/2005 | Pfeiffer et al. |
| 2005/0239419 A1 | 10/2005 | Fudaba et al. |
| 2006/0109191 A1* | 5/2006 | Shtrom et al. .......... 343/795 |
| 2006/0199620 A1 | 9/2006 | Greene et al. |
| 2006/0234694 A1 | 10/2006 | Kawasaki et al. |
| 2007/0183545 A1 | 8/2007 | Yuda et al. |

OTHER PUBLICATIONS

Gregory D. Durgin, "Space-Time Wireless Channels", Oct. 3, 2002, Prentice Hall, p. 193-196 located at http://academic.safaribooksonline.com/booWelectrical-engineering/communicationsengineering1013065647x/diversity/ch08lev1sec2.

Theodore S. Rappaport, "Wireless Communications Principles and Practice, Second Edition", Dec. 31, 2001, Prentice Hall, pp. 385-387 located at http://academic.safaribooksonline.com/booWelectrical-engineering/communicationsengineering10130422320/equalization-diversity-and-channel-coding/chO7lev1sec10.

\* cited by examiner

MULTI-CHANNEL RX/TX CALIBRATION AND LOCAL OSCILLATOR MISMATCH MITIGATION

RELATED APPLICATIONS

This application is a divisional of U.S. patent application Ser. No. 12/942,659, entitled "Multi-Channel RX/TX Calibration And Local Oscillator Mismatch Mitigation" filed Nov. 9, 2010 which is a divisional of U.S. patent application Ser. No. 11/613,977, entitled "Multi-Channel RX/TX Calibration And Local Oscillator Mismatch Mitigation" filed Dec. 20, 2006 which claims priority of U.S. Provisional Patent Application 60/753,795, entitled "Multi-Channel RX/TX Calibration And LO Mismatch Mitigation" filed Dec. 22, 2005.

BACKGROUND OF THE INVENTION

1. Field of the Invention

The present relates to multi-channel receiver/transmitter calibration and local oscillator mismatch mitigation.

2. Description of the Related Art

Many wireless systems employ some form of multiple-radio signal combining to improve range and reliability in wireless systems. For example, maximal ratio combining can be employed to improve the signal to noise ratio (SNR) of signals simultaneously received from multiple antenna elements and receivers. The multiple receivers may be instantiated on a single chip or, alternatively, may be formed by duplicating analog radios. To provide optimized gains on transmit, the phase difference of the transmit waveforms can be controlled at the antenna elements. This control applies a known beam pattern on transmit based on a receive beam pattern to achieve similar gains for the wireless link on both receive and transmit.

Transmit beamforming schemes that use transmit phase calibration of the differences between the duplicated analog radios depend on a consistent phase relationship between the radios for the duration of the calibration period. Unfortunately, radio architectures that employ duplicated local oscillator generation circuits per radio can provide inconsistent phase states on initialization even when derived from a common lower frequency reference clock. The resulting uncertainty in local oscillator initialization states either requires a new transmit phase calibration per initialization or a one-time transmit phase calibration with a method for compensating for the local oscillator phase difference component of the transmit phase calibration per initialization.

For transmit beam forming some form of phase calibration of receive and transmit analog radios can be performed. A need arises for a method of calibrating the phase differences between transmit and receive analog components to achieve a controlled array pattern on transmit based on information derived on receipt. A further need arises for a method for transmit beam forming to compensate for local oscillator phase ambiguity between radios sharing a reference clock.

SUMMARY OF THE INVENTION

In accordance with one aspect of the invention, a method of optimizing transmit beam forming in a multiple radio wireless system is provided. In this method, a stimulus signal can be provided to an analog receive input of a device under test (DUT), the DUT including multiple radios. A receive phase and amplitude can be measured at baseband using the stimulus signal for each radio. At this point, a receive weight can be determined using the receive phases and amplitudes. A receive weight conjugate can then be derived from the receive weight. Using this receive weight conjugate, a transmit weight can be computed. This transmit weight can be applied to transmit signals during the transmit beam forming using the multiple radios.

In one embodiment, the method of optimizing transmit beam forming can further include computing a calibration vector and deriving an associated calibration vector conjugate. In this embodiment, the product of the receive weight conjugate and the calibration vector conjugate generate the transmit weight.

In one embodiment, computing the calibration vector can include activating a shunt switch that connects receive components of the multiple radios. Computing the calibration vector and deriving the calibration vector conjugate can also include comparing a peak power during a range of phase shifts to a power as received by a unit providing the stimulus signal while the analog radios are transmitting. Computing the calibration vector and deriving the calibration vector conjugate can further include identifying a calibration phase that maximizes power. Alternatively, computing the calibration vector and deriving the calibration vector conjugate can further include identifying a calibration phase that minimizes power and add 180 degrees to the calibration phase.

A radio frequency (RF) system can advantageously include a shunt switch for optimizing transmit beam forming for multiple radios. Each radio can include an antenna, a T/R switch, an LNA, receive components, and transmit components. An exemplary RF system with first and second radios can include first and second antennas connected to first and second transmit/receive (T/R) switches. First and second low noise amplifiers (LNAs) can be connected to the first and second T/R switches, respectively. In the first radio, the first receive components and first transmit components can be connected to the first T/R switch. In the second radio, the second transmit components can be connected to the second T/R switch. Notably, the shunt switch can selectively connect the second receive components to either the first LNA or the second LNA.

An exemplary shunt switch can include a diode that acts as the switch. For example, the shunt switch can include a first capacitor connected between a first antenna path and a first node, a diode having an anode connected to the first node and a cathode connected to a second antenna path, a first inductor connected between the cathode of the diode and ground, a first resistor connected between a control signal terminal and a second node, a second inductor connected between the second node and the first node, a second capacitor connected between the second node and ground, and a third capacitor coupled between the first node and radio receiver components. In one embodiment usable during simulation, the shunt switch can further include a second resistor connected between the first node and the third capacitor, a fourth capacitor connected between the control signal terminal and ground, and a fifth capacitor connected between the first node and ground.

DETAILED DESCRIPTION OF THE FIGURES

Multi-Channel Rx/Tx Calibration

Figure 1A:
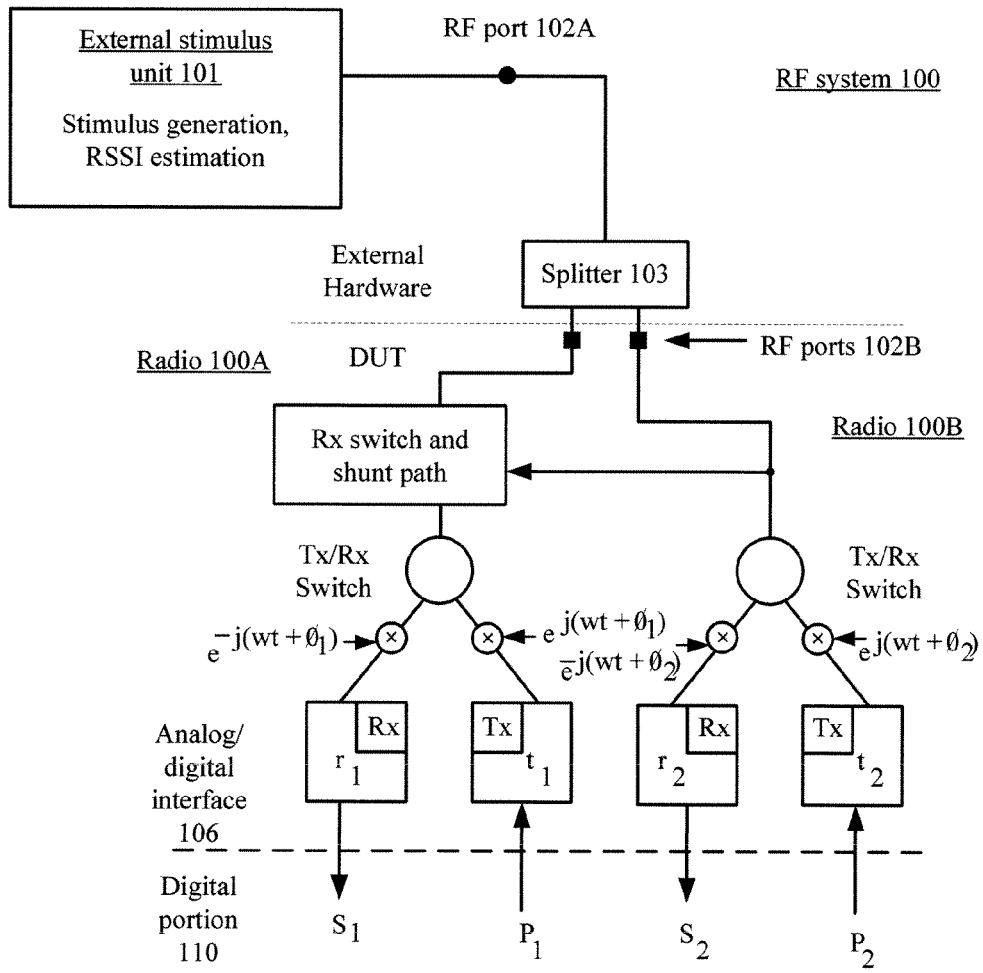
FIG. 1A illustrates an RF system including two radios that can use commonly received signals to calibrate phase differences.

FIG. 1A illustrates an exemplary RF system 100 including multiple radios, i.e. radio 100A and radio 100B. For transmit beam forming in conjunction with receive combining in RF system 100, the relative phase difference measured at the antennas (e.g. connected to RF ports 102B) on receive provides information on the appropriate phase difference at the antenna for transmit. However, the phase difference on receive is typically measured on digitized baseband receive signals as analyzed in digital portion 110. Because radio 100A and 100B independently apply a phase shift on receive, especially where radios 100A and 100B are disposed in separate integrated circuits, a portion of the phase difference measured on the baseband digitized receive signal is due to the difference in phase shifts of the analog receivers $r_1$ and $r_2$. Similarly, radios 100A and 100B provide an independent phase shift during transmit. Therefore, to achieve a controlled beam pattern on transmit based on information derived from the baseband receive waveforms, the transmit and receive phase differences between radios 100A and 100B must be compensated for to provide the desired phase difference at the RF port for transmit waveforms.

In accordance with one embodiment, the effects of receive and transmit phase shifts can be measured in radios 100A and 100B by providing a stimulus signal to the analog receive input of the device under test (DUT). The stimulus signal, which can be generated by external stimulus unit 101, may be applied to the DUT via a splitter 103 at a manufacturing test station provided for this purpose. Note that splitter 103 is connected to external stimulus unit 101 via an RF port 102A. Splitter 103 provides that stimulus signal to RF ports 102B, which in turn then provide the stimulus signal to both radios 100A and 100B.

Figure 1B:
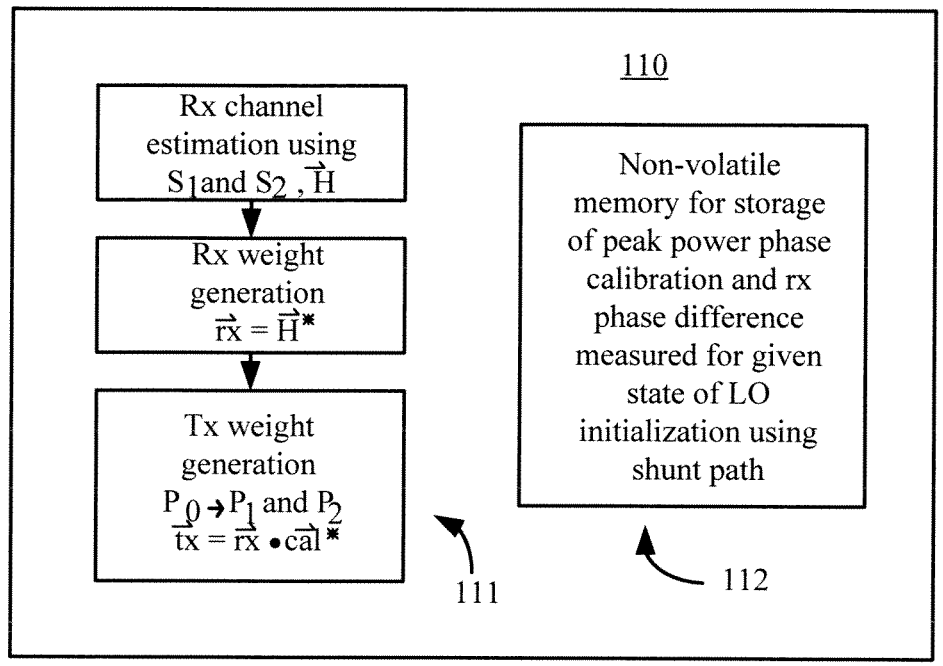
FIG. 1B illustrates a digital portion of the RF system shown in FIG. 1A.

The receive phase and amplitude relationship is then measured at baseband in digital portion 110. FIG. 1B illustrates an exemplary, simplified digital portion 110 of RF system 100 (FIG. 1A). In this embodiment, digital portion 110 can include means for providing functionality 111. For example, functionality 111 includes determining channel estimation using digital signals $S_1$ and $S_2$ (e.g. H(vector) can be computed, which is the measured vector between digital signals $S_1$ and $S_2$). This measured vector represents the undesirable difference between the digital signals. Therefore, to ameliorate this undesirable difference, the conjugate of H(vector), i.e. H(vector)*, can be computed. Specifically, this H(vector)* (also called rx(vector) or the Rx weight) can be used in the operation of the radio to mitigate the undesirable difference of H(vector).

To compute the transmit weight tx(vector), both the rx weight and a conjugate of the calibration vector can be used. Specifically, the product of the rx weight and the conjugate of the calibration vector provides the transmit vector. The calibration vector can be derived using the methods described below for local oscillator (LO) mismatch mitigation. This transmit vector can then be applied to the two digital transmit signals $P_1$ and $P_2$ (wherein $P_o$ is the initial transmit signal that is divided into $P_1$ and $P_2$ for actual transmission using radios 100A and 100B. Note that the notation and associated computation for functionality 111 is well known to those skilled in the art and therefore is not described in detail herein.

Note that analog/digital interface 106 converts the processed analog signals generated by analog receivers $r_1$ and $r_2$ to provide digital signals $S_1$ and $S_2$, respectively. Similarly, analog/digital interface 106 converts the processed digital signals $P_1$ and $P_2$, which are generated by digital portion 110, to analog signals that are provided to transmitters $t_1$ and $t_2$, respectively.

Based on this information, a transmit phase and amplitude are derived for the transmit signals. In addition to the transmit phase and amplitude weighting derived from the receive signals using functionality 111 in digital portion 110, a transmit calibration phase is applied to offset the phase of the transmit signals associated with radios 100A and 100B.

This calibration phase can advantageously compensate for the difference in receive to transmit phase shift between radios 100A and 100B. In one embodiment, the transmit calibration phase can be swept over a range of phase shifts while monitoring the power delivered in the direction of the stimulus signal. The calibration phase that maximizes the signal power delivered to the device providing the signal stimulus is stored in non-volatile memory 112 of digital portion 110 (see FIG. 1B) as the phase calibration to be used in operation.

Figure 1C:
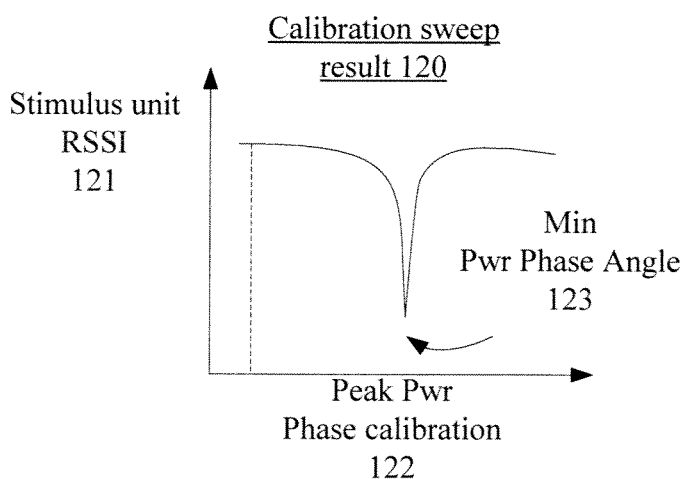
FIG. 1C illustrates a graph indicating a calibration sweep result using the RF system shown in FIGS. 1A and 1B.

An alternative method to finding the appropriate transmit calibration phase is to determine an appropriate transmit weighting based on the receive waveforms as before, but sweep the calibration phase applied to transmit to identify the calibration phase that minimizes the power delivered to external stimulus unit 101 providing the stimulus signal. FIG. 1C illustrates an exemplary calibration sweep 120 in a graph plotting RSSI 121 (as measured at the stimulus unit) and peak power 122. This null-finding technique is advantageous in that the null, e.g. minimum power phase angle 123, is sharper than the lobe, thereby yielding an easily detected and accurate measurement. Note that the appropriate transmit calibration phase to be used in this method is the minimum power phase angle plus 180 degrees.

Once a phase difference between receive channels is measured, the correction factor may be stored in, for example, non-volatile memory 112 (FIG. 1B). Transmit weights may be calculated by functionality 111 (in digital portion 110) forming the product of the stored calibration data and the calculated receive weights.

For transmit beam forming in conjunction with receive combining in a multiple radio wireless system, the difference in phase of the waveforms arriving at each antenna on receive can advantageously provide information on the appropriate difference in phase to be applied at the antennas for transmit under the current wireless channel conditions.

In accordance with one aspect of the invention, to achieve a controlled beam pattern on transmit based on information derived from the baseband receive waveforms, the ratio between radios of the cumulative effects of receive and transmit phase shifts can be calibrated and applied as a phase offset between the radios on the transmit signal. After the appropriate transmit calibration phase angle is measured, this value can be used as long as the phase relationships between chains on transmit and receive are preserved. In one embodiment, if the analog radios consistently power-up with similar phase shift differences between transmit and receive, then a one-time transmit phase calibration result may be stored in non-volatile memory on the device and used for power-up operations.

Multi-Channel Local Oscillator (LO) Mismatch Mitigation

In one embodiment, if the analog radios consistently power-up with similar phase shift differences between transmit and receive but with an additional phase shift due to local oscillator initialization, then a one-time transmit phase calibration scheme can be employed. However, in this case, with local oscillator initial phase ambiguity, some method of determining the relative phase between the radio local oscillators per initialization should be employed to compensate for this additional phase shift in the transmit phase calibration.

In accordance with one aspect of the invention, the local oscillator contribution per initialization can be determined by measuring the receive baseband phase difference of a stimulus signal with fixed phase difference at the receive antenna port and then repeating this measurement at each initialization. Notably, the method of determining the local oscillators' relative ambiguity can be accomplished away from a manufacturing test bed.

Figure 2:
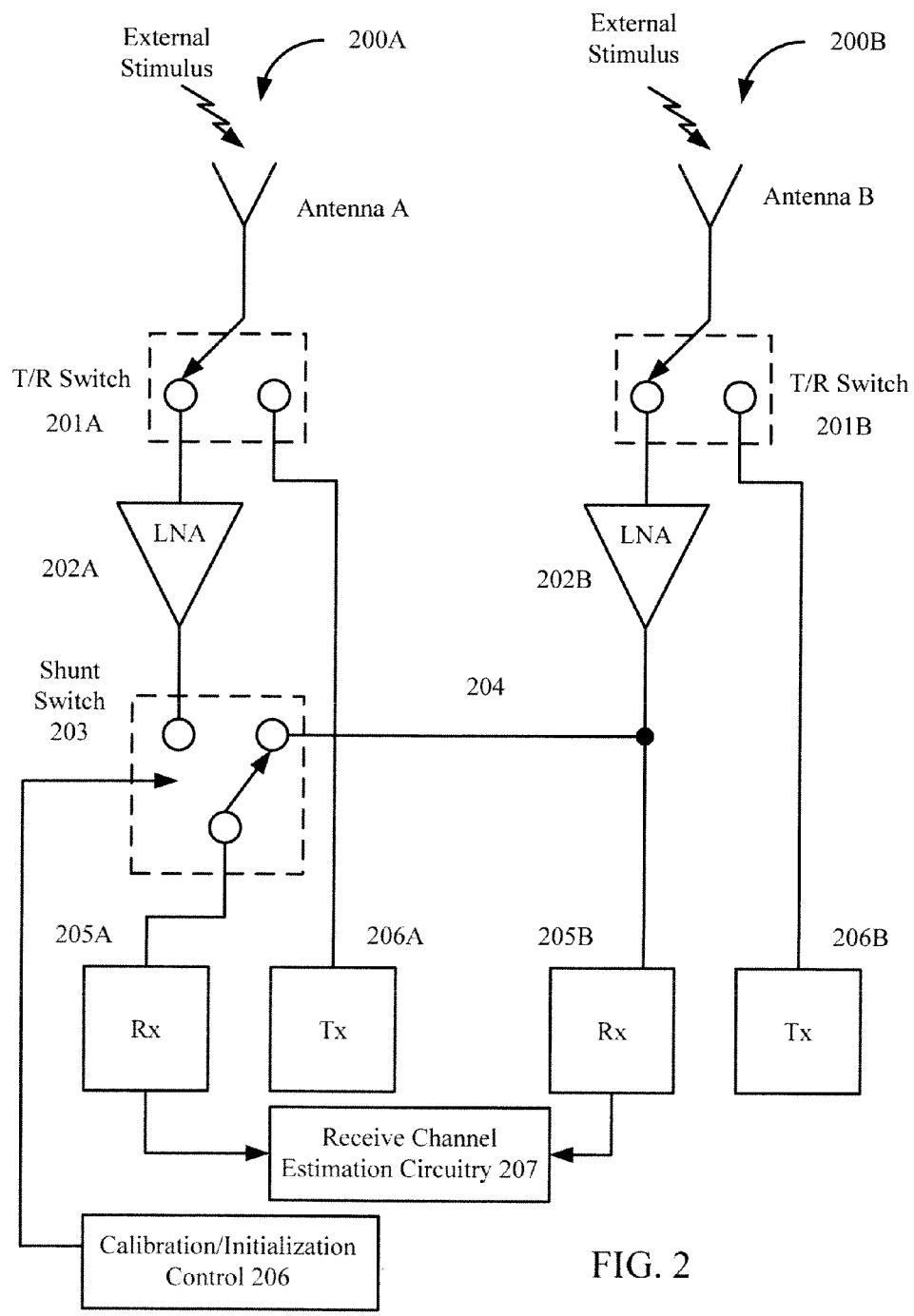
FIG. 2 illustrates a shunt switch that allows measuring of a receive phase difference between two radios.

For example, FIG. 2 illustrates two radios 200A and 200B associated with antennas A and B, respectively, that can both receive external stimulus signals. In one embodiment, a stimulus signal can instead be generated locally by one of radios 200A and 200B. Radio 200B, which is associated with antenna B, includes a transmitter/receiver (T/R) switch 201B that can selectively connect antenna B to a receive path including a low noise amplifier (LNA) 202B and receiver components 205B or a transmit path including transmitter components 206B.

Radio 200A, which is associated with antenna A, includes a transmitter/receiver (T/R) switch 201A that can selectively connect antenna A to a receive path including an LNA 202A or a transmit path including transmitter components 206A. In this embodiment, transceiver path 200A further includes a shunt switch 203 that can selectively connect receiver components 205A with either LNA 202A or LNA 202B.

Thus, in this configuration, shunt switch 203 can advantageously provide a common receive (e.g. stimulus) signal to both receive components 205A and 205B, thereby facilitating measuring a receive phase difference between radios. Specifically, shunt switch 203 can be "enabled", i.e. connecting receiver components 205A to line 204 and LNA 202B, and T/R switch 201A can be "open", i.e. connecting antenna A of radio 200A to neither the receive path, which includes LNA 202A, nor the transmit path, which includes transmitter components 206A. In one embodiment, the control signal for shunt switch 203 can be generated by calibration/initialization control 206. Note that calibration/initialization control 206 could be implemented on an integrated circuit with radio 200A or could be off-chip to both radios 200A and 200B. Further note that calibration/initialization control 206 could be implemented with, for example, and without limitation, state machines, software, registers, or hardware.

In this embodiment, to maximize receive sensitivity, shunt switch 203 can advantageously be placed downstream of LNA 202A (i.e. behind the first amplification stage) but upstream of receiver components 205A (e.g. preceding the first mixing stage where the local oscillator relative phase shift will be added). After resolution of the local oscillators' relative ambiguity, shunt switch 203 can be "disabled", i.e. connecting receiver components 205A to LNA 202A (for standard operation), and T/R switch 201A can be "closed", i.e. connecting antenna A to one of the receive path and the transmit path in radio 200A.

In one embodiment, receive channel estimation circuitry 207 can advantageously perform this receive phase difference measurement during calibration (a one-time event typically performed by the manufacturer) and then later at initialization (typically performed by the user). Using these two measurements, the change in receive phase difference between radios 200A and 200B can be used to estimate the appropriate offset from the one-time calibration phase to the proper calibration phase given the current local oscillator initialized states. That is, the change in receive phase difference between radios 200A and 200B can be used to compensate for the local oscillators' relative ambiguity. This receive phase difference can be determined by digital portion 110 using functionality 111 (FIG. 1B).

Note that the amount of compensation can depend on the radio architecture. For example, with a super-heterodyne radio or transceiver that uses low-side injection (i.e. a carrier frequency less than the frequency of the local oscillator) for the mixers on receive and high-side injection (i.e. a carrier frequency greater than the frequency of the local oscillator) on transmit, the additional local oscillator phase shift component will be equal in the amount of phase shift but of opposite sign. Thus, if an X degree phase shift is measured on receive after initialization as compared to a Y degree phase shift measured on receive during the one-time calibration, then the additional phase shift on receive due to local oscillator initialization can be estimated as (X-Y) and the additional phase shift on transmit can be estimated as -(X-Y).

Further note that the compensation applied to the calibration phase can also depend on the method of signal processing applied to generate receive and transmit coefficients (e.g. the phi coefficients of the "e" terms provided to the mixers of the radios in RF system 100, wherein $e^{j(w+\Phi)}$ is representative of a sine wave oscillation with a particular phase offset). For example, if the receive processing measures the relative phase between receive baseband signals and applies the conjugate of this phase on transmit, then the appropriate calibration phase compensation is the conjugate of twice the local oscillator contribution.

Notably, the above-described phase calibration technique can advantageously permit the resolution of the local oscillators' relative ambiguity without the necessity of receiving feedback channel state information from a cooperative wireless device. Therefore, the above-described phase calibration can be used in, for example, a legacy wireless LAN environment.

Figure 3:
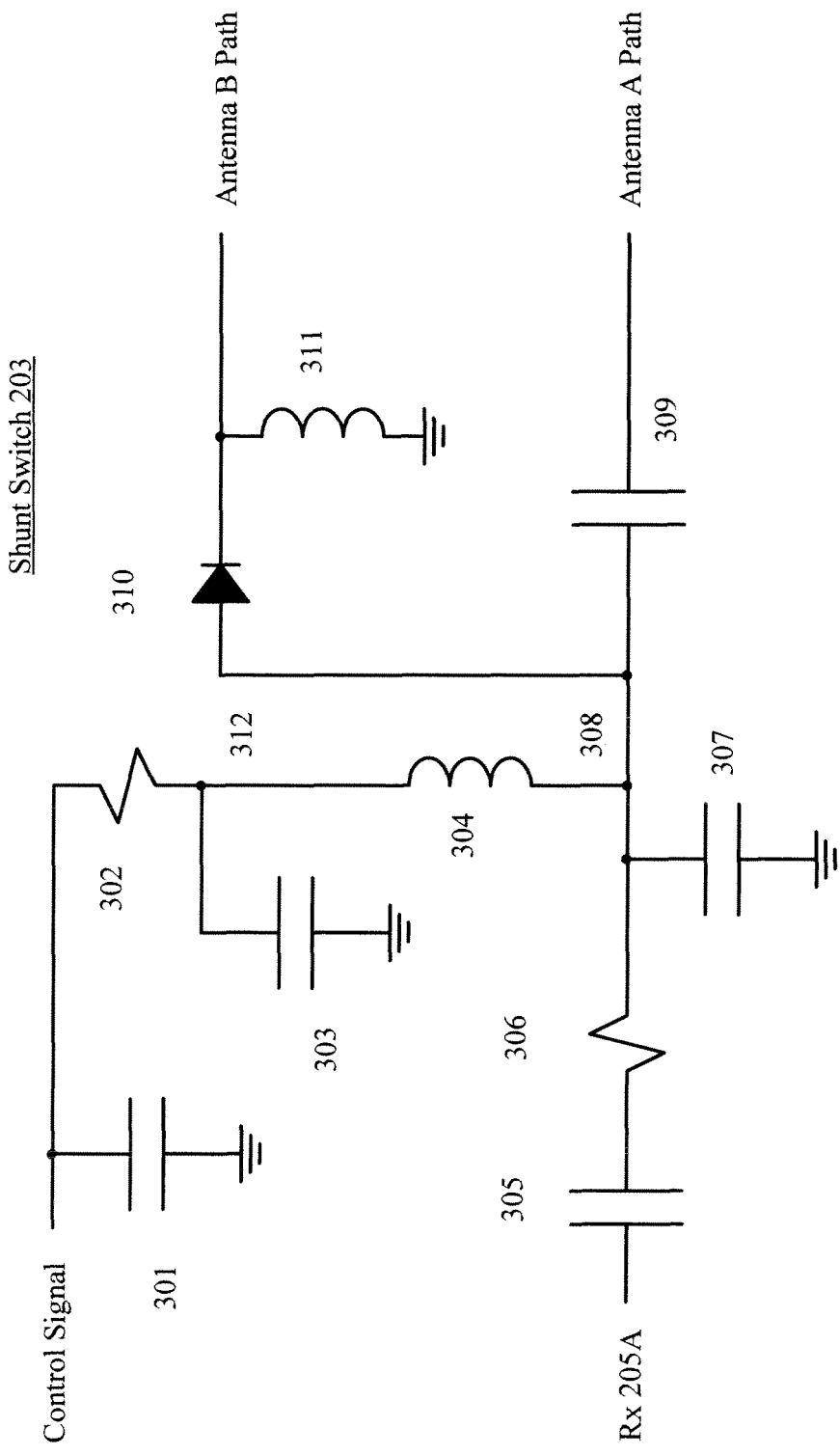
FIG. 3 illustrates an exemplary embodiment of the shunt switch of FIG. 2.

FIG. 3 illustrates an exemplary embodiment of shunt switch 203. In this embodiment, a capacitor 309 is connected between the antenna A path and a node 308. An anode of a diode 310 is connected to node 308, whereas its cathode is connected to the antenna B path. An inductor 311 is connected between the cathode of diode 310 and ground. A resistor 302 and an inductor 304 are connected in series between a control signal terminal and node 308. A capacitor 301 is connected between the control signal terminal and ground. Another capacitor 303 is connected between ground and a node between resistor 302 and inductor 304. A capacitor 305 and a resistor 306 are connected in series between receiver components 205 and node 308. A capacitor 307 is connected between ground and a node between resistor 306 and node 308.

In this configuration, if there is no forward biasing of diode 310, then shunt switch 203 connects LNA 202A (in the Antenna A path shown in FIG. 3) to receiver 205A via capacitors 309/305. When connection of Antenna A and Antenna B paths is desired, a logic 1 control signal can be provided to shunt switch 203. This control signal can be filtered by capacitor 301, resistor 302, and capacitor 303. Two RF chokes are provided by inductors 304 and 311. This logic high control signal forward biases diode 310, thereby connecting the Antenna B path to the Antenna A path at node 308. Note that at this time, all components to the right of capacitor 309 are effectively disconnected. In one embodiment, resistor 306 and capacitor 307 can be used during simulation to represent exemplary resistance and capacitance values of receiver 205A.

A detailed description of one or more preferred embodiments of the invention is described above with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

The invention claimed is:

1. A shunt switch for a multiple radio wireless system, the shunt switch comprising:
   a first capacitor connected between a first antenna path, which is associated with a first antenna, and a first node;
   a diode having an anode connected to the first node and a cathode connected to a second antenna path, which is associated with a second antenna, separate from the first antenna;
   a first inductor connected between the cathode of the diode and ground;
   a first resistor connected between a control signal terminal and a second node;
   a second inductor connected between the second node and the first node;
   a second capacitor connected between the second node and ground;
   a third capacitor coupled between the first node and radio receiver components of a first radio;
   a controller in electrical communication with the control signal terminal and configured to selectively bias the diode to switch between a first electrical path and a second electrical path such that the first radio and a second radio receive a common signal to facilitate measuring a receive phase difference between the first and second radios.

2. The shunt switch of claim 1, further including: a second resistor connected between the first node and the third capacitor; a fourth capacitor connected between the control signal terminal and ground; and a fifth capacitor connected between the first node and ground.

3. The shunt switch of claim 1, wherein the first electrical path connects the radio receiver components of the first radio with the first antenna path.

4. The shunt switch of claim 1, wherein the second electrical path connects the radio receiver components of the first radio with the second antenna path.

* * * * *